(12) United States Patent
Fallon et al.

(10) Patent No.: US 6,674,506 B2
(45) Date of Patent: Jan. 6, 2004

(54) APPARATUS FOR INTRODUCING A FLUID INTO VIAS FORMED IN A LIQUID CRYSTAL DISPLAY ELEMENT

(75) Inventors: Kenneth M. Fallon, Rochester, NY (US); Charles F. Scaglione, Bergen, NY (US)

(73) Assignee: Eastman Kodak Company, Rochester, NY (US)

( * ) Notice: Subject to any disclaimer, the term of this patent is extended or adjusted under 35 U.S.C. 154(b) by 14 days.

(21) Appl. No.: 10/012,077

(22) Filed: Nov. 29, 2001

(65) Prior Publication Data

US 2003/0098942 A1 May 29, 2003

(51) Int. Cl.⁷ ................................. G02F 1/13
(52) U.S. Cl. ............... 349/187; 349/189; 349/190; 349/153; 349/158; 349/149; 349/150; 349/188; 438/30; 438/613; 438/29; 438/34
(58) Field of Search ............... 349/187, 189, 349/190, 153, 158, 149, 150, 188, 155, 191, 192; 438/30, 613, 29, 34

(56) References Cited

U.S. PATENT DOCUMENTS

| | | |
|---|---|---|
| 3,934,336 A | 1/1976 | Morse |
| 4,963,002 A | 10/1990 | Tagusa et al. |
| 5,106,441 A * | 4/1992 | Brosig et al. ............... 156/104 |
| 5,142,644 A | 8/1992 | VanSteenkiste et al. |
| 5,317,438 A | 5/1994 | Suzuki et al. |
| 5,371,619 A | 12/1994 | Sirkin et al. |
| 5,436,744 A | 7/1995 | Arledge et al. |
| 5,556,670 A * | 9/1996 | Mihara et al. ................. 428/1 |
| 5,557,436 A | 9/1996 | Blose et al. |
| 5,625,476 A | 4/1997 | Kim |
| 5,629,787 A | 5/1997 | Tsubota et al. |
| 5,672,083 A | 9/1997 | Curtin et al. |
| 5,757,445 A | 5/1998 | Vu et al. |
| 5,831,699 A | 11/1998 | Wright et al. |
| 5,834,327 A * | 11/1998 | Yamazaki et al. ............ 438/30 |
| 5,840,417 A | 11/1998 | Bolger |
| 5,889,568 A | 3/1999 | Seraphim et al. |
| 5,942,066 A * | 8/1999 | Sunaga et al. ............... 156/102 |
| 6,055,035 A * | 4/2000 | von Gutfeld et al. ........ 349/187 |
| 6,061,105 A | 5/2000 | Nakagawa |
| 6,144,425 A * | 11/2000 | Kawabata et al. ............ 349/73 |
| 6,172,731 B1 | 1/2001 | Nagano et al. |
| 6,204,896 B1 * | 3/2001 | Matsuhira et al. ............ 349/12 |
| 6,285,433 B1 * | 9/2001 | Kawasaki .................... 349/149 |
| 6,512,563 B1 * | 1/2003 | Tajima ........................ 349/123 |

FOREIGN PATENT DOCUMENTS

CA    2279780    8/1999

* cited by examiner

Primary Examiner—Nathan J. Flynn
Assistant Examiner—Fazli Erdem
(74) Attorney, Agent, or Firm—Clyde E. Bailey, Sr.

(57) ABSTRACT

An apparatus introduces fluid in vias formed in an LCD element free of voids or air bubbles in the fluid material. A support base secures the LCD element in place during fluid flow from a fluid dispenser positioned proximate to the LCD element. Fluid flow is facilitated by thermal energy from a heating element arranged in thermal contact with the support base.

8 Claims, 6 Drawing Sheets

APPARATUS FOR INTRODUCING A FLUID INTO VIAS FORMED IN A LIQUID CRYSTAL DISPLAY ELEMENT

CROSS-REFERENCE TO RELATED APPLICATIONS

The present application is related to U.S. application Ser. No. 10/013978, filed Nov. 29, 2001, by Kenneth M. Fallon, et al., and entitled, "Liquid Crystal Display Element" U.S. application Ser. No. 10/013978 filed Nov. 29, 2001, by Kenneth M. Fallon, et al., and entitled, "Liquid Crystal Display And Method Of Making Same," U.S. application Ser. No. 10/112276 filed Nov. 29, 2001, by Kenneth M. Fallon, et al., and entitled, "Method Of Constructing A Liquid Crystal Display Element Or Similar Article Of Manufacture" and U.S. application Ser. No. 10/007029 filed Nov. 29, 2001, by Kenneth M. Fallon, et al., and entitled, "Method Of Delivering Fluid Into Constricted Openings Free Of Voids."

FIELD OF THE INVENTION

The invention relates generally to the field of liquid crystal displays (LCDs). More particularly, the invention concerns an apparatus for dispensing or introducing an adhesive material into vias of a liquid crystal display element free of voids or air bubbles thereby substantially eliminating light scattering during LCD operations.

BACKGROUND OF THE INVENTION

Conventional liquid crystal displays are formed by bonding two substantially planar substrates, commonly referred to as a panel electrode, and a drive or signal substrate, together with a gap between them and then injecting a liquid crystal in the gap. Electrical connectivity between the drive and panel substrates is typically achieved with an anisotropic conductive film that connects wiring terminals on a flexible polyimide drive substrate with transparent electrode terminals formed on the panel substrate. Prior to bonding the substrates, a transparent coating of indium tin oxide (ITO) is deposited on both the panel and drive substrates forming a patterned ITO layer on the substrate(s). After forming the patterned ITO layer, the two glass substrates are then bonded together with a known gap therebetween. To complete the manufacturing process of the LCD, a liquid crystal material is then vacuum filled in the gap of the bonded substrates thereby forming an active liquid crystal display.

U.S. Pat. No 5,629,787, entitled "Method For Producing An LCD By Pressing The Substrates" by Tsubota et al., May 13, 1997, is illustrative of an existing process for making a typical liquid crystal display in which a spacer is used to determine the gap between the transparent substrates. Moreover, an ITO layer is coated only on one active surface of the transparent substrate. This reference, however, does not teach the presence of a plurality of adhesive filled, void-free vias formed in one of the substrates.

Canadian Patent Application No. 2,279,780, entitled "Light Density Control With LCD Arrangement" by Kraft, et al. filed Aug. 9, 1999, discloses a LCD arrangement with improved exposure control in a photo finishing environment in which multiple picture elements (pixels) associated with electrodes are positioned on bonded transparent plates and feed conductors to the electrodes feed control signals thereto. Referring to FIG. 1, a typical prior art LCD display element 1 contains vias 2 or feed throughs in a transparent substrate 3 and patterning of an ITO layer 6 on opposed active surfaces 4 and 5. Although the reference teaches vias 2 filled with an adhesive material layer 9 in the transparent substrate 3, the reference clearly recognizes that air bubbles or voids 8 exist in the adhesive material 9 filling the vias 2 that necessitates vacuum removal. Moreover, the reference does not recognize controlling the height and thickness of the adhesive material 9 as important factors in bonding a deck plate 7 to a transparent substrate 3 with an ITO coating layer 6 applied to the active surfaces 4, 5 or filling the vias 2.

U.S. Pat. No. 6,061,105, entitled "LCD With Via Connections Connecting The Data Line To A Conducting Line Both Before And Beyond The Sealing Material" by Nakagawa, May 9, 2000, discloses a liquid crystal display device that can eliminate an electrostatic discharge (ESD) problem resulting from a high dielectric constant filler that is appropriate for improved shape stability of a sealing material. While this reference is generally believed to teach a good solution to the electrostatic discharge problems encountered in the LCD display fabrication process, it does not teach or suggest adhesive filled, void-free vias formed in one of the substrates.

U.S. Pat. No. 6,061,105 discloses using vias connections in thin film transistors (TFT) connections. This reference, however, does not present vias in the transparent substrate that feed ITO from one active surface to an opposed active surface of the transparent substrate. According to the prior art reference, the vias are formed in the seal area and outside the active pixels area of the display. Thus, the reference does not contemplate the use of optical grade adhesives nor the need to maintain transparency in the active area. Hence this reference shows no appreciation for Applicants' problem or proposed solution.

Therefore, a need persists in the art for a liquid crystal display element and method of making same in which vias are formed in a substrate and then specially filled with an optical grade adhesive. The adhesive material filling the vias are virtually free of voids which substantially eliminates light scatter in an operating LCD, for instance, in a photo-finishing application.

SUMMARY OF THE INVENTION

It is, therefore, an object of the invention to provide a method of constructing a liquid crystal display (LCD) element having vias formed in one of two substrates filled with an optical grade adhesive in a manner that resists the scatter of light.

Another object of the invention is to provide an apparatus for introducing an adhesive material into such vias in the aforementioned LCD element free of voids in the adhesive materials filling the vias.

The present invention is directed to overcoming one or more of the problems set forth above. Briefly summarized, according to one aspect of the present invention, an apparatus for introducing a fluid free of voids into vias formed in a liquid crystal display element has a support base for securing the LCD element during the dispense process. A fluid dispenser that has a fluid outlet orifice and a reservoir is arranged relative to the support base for facilitating fluid flow between the fluid outlet orifice and the vias in the LCD element. Fluid flow is facilitated by a heating element in thermal contact with the support base.

In another aspect of the invention, a method of introducing a fluid into vias formed in a LCD element substantially free of voids in the fluid includes providing a fluid dispenser apparatus having a support base for securely holding the LCD element and a recess portion formed in the support base configured for openly supporting the vias. Fluid flow is facilitated between the fluid dispenser and the LCD element by a heating element that preheats the LCD resting thereon.

Thus, the apparatus and method of the present invention have numerous advantageous effects over prior art developments, including: air bubble free or void-free adhesive material filling vias formed in the signal plate; air bubble free or void free adhesive material bonding the signal plate and deck plate; thickness controlled adhesive material levels dispensed into vias; efficient vias fill associated with controlled signal to deck plate gap width; fewer process steps in the LCD subassembly process; and, substantially simple process for locating the deck plate in the LCD element.

BRIEF DESCRIPTION OF THE DRAWINGS

The above and other objects, features, and advantages of the present invention will become more apparent when taken in conjunction with the following description and drawings wherein identical reference numerals have been used, where possible, to designate identical features that are common to the figures, and wherein.

DETAILED DESCRIPTION OF THE INVENTION

Figure 2:
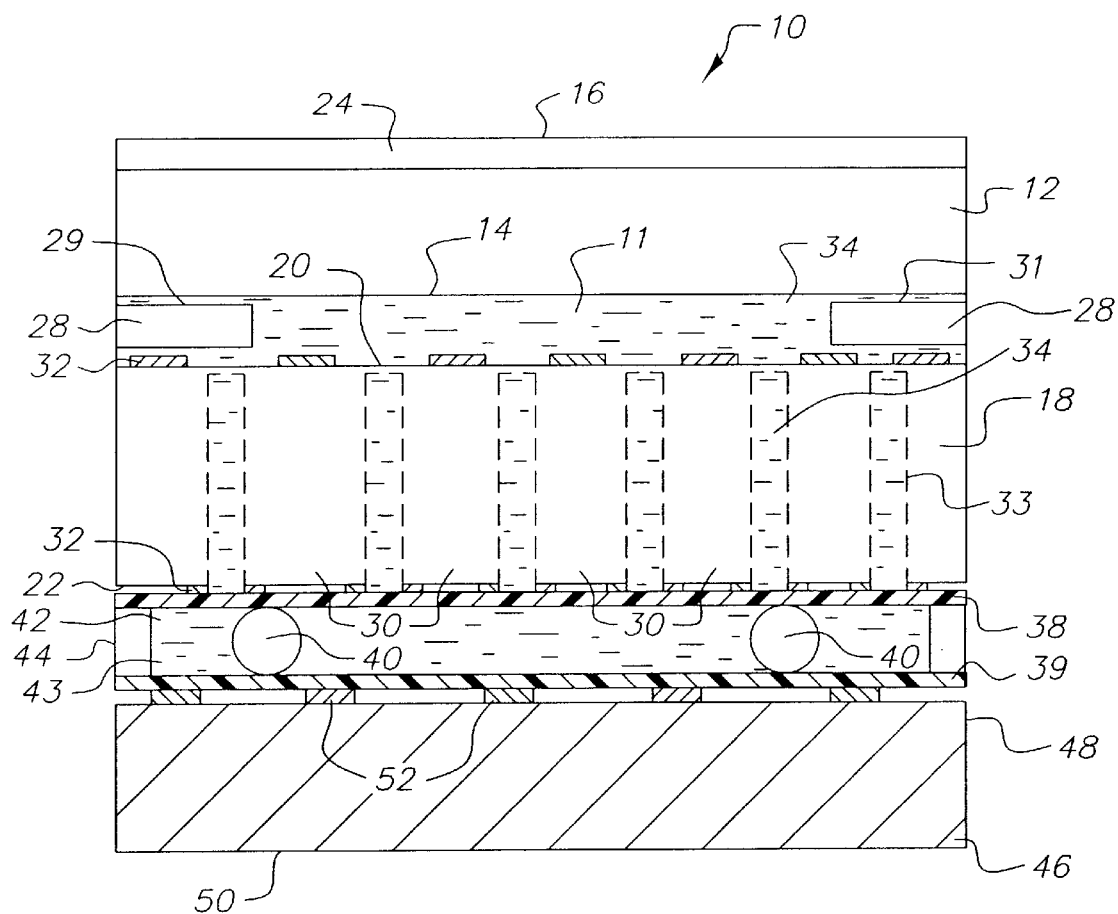
FIG. 2 is a perspective view of the liquid crystal display element of the invention.
Figure 3:
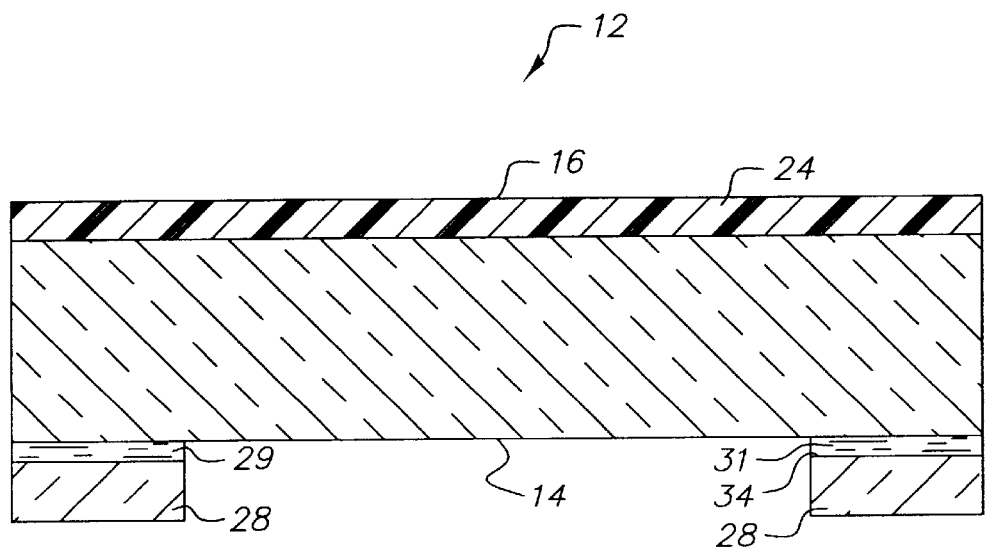
FIG. 3 is a cross-sectional view of the first transparent substrate of the invention.
Figure 4:
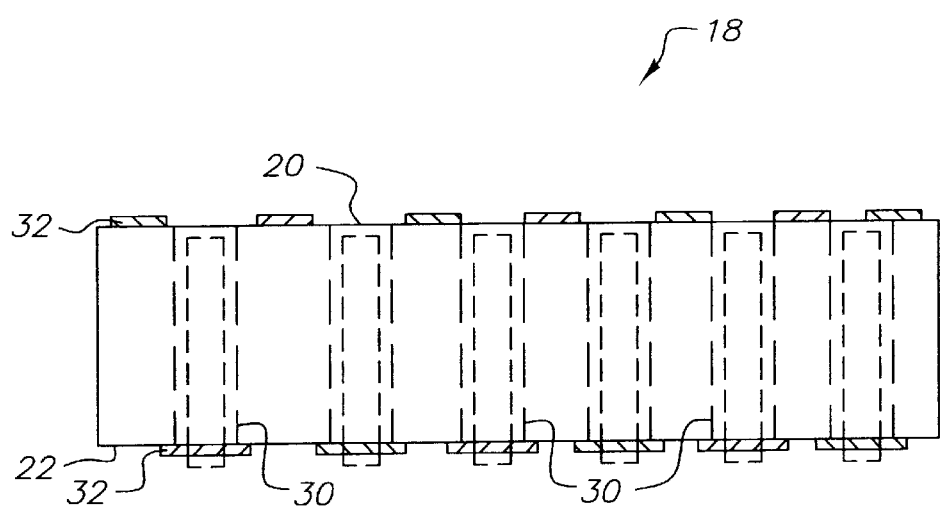
FIG. 4 is a cross-sectional view of the second transparent substrate showing the vias passing through the active surfaces; and, FIG. 5 is a sectional view of the apparatus used for filling vias void-free in the second transparent substrate.

Turning now to the drawings, and particularly to FIGS. 2, 3, and 4, the liquid crystal display (LCD) element 10 or components thereof made in accordance with the method of the invention is illustrated. According to FIGS. 3 and 4, liquid crystal display element 10 is generally defined as having a first transparent substrate, or alternatively deck plate, 12 fixedly bonded to a second transparent substrate, or alternatively signal plate, 18. According to FIG. 2, among other things, deck plate 12 provides barrier protection for an indium tin oxide (ITO) coating layer 32 deposited on active surface 20 of signal plate 18.

Referring to FIG. 2, the ITO coating layer 32 provides electrical continuity between active surfaces 20, 22 through vias 30. It should be appreciated that existing LCD panels teach an ITO coating layer 32 deposited only on one active surface of the signal plate in contradistinction to the present LCD element having an ITO coating layer 32 deposited on opposing active surfaces 20, 22 of signal plate 18.

Figure 1:
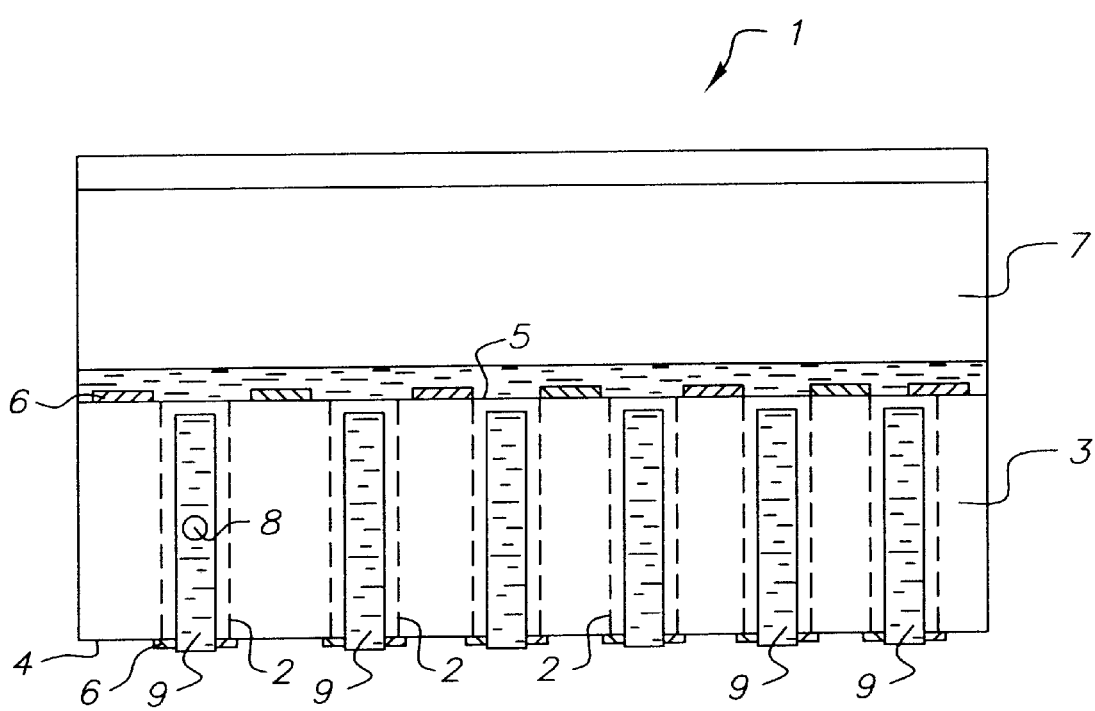
FIG. 1 is a prior art liquid crystal display element having a void in an adhesive filled vias.

Referring to FIGS. 2 and 4, important to the present invention, a plurality of through holes, commonly referred to as vias 30, is formed in the signal plate 18. As indicated, vias 30 provide electrical continuity paths between the opposing active surfaces 20, 22 of the signal plate 18, as described in greater details below. Skilled artisans in the field of LCD manufacturing will appreciate that the present invention necessitates solving a range of new and challenging problems never before presented in traditional LCD manufacturing. To maintain transparency of the signal plate 18, it was discovered that vias 30 then had to be filled with an optical grade adhesive material 34 (described below) free of air bubbles or voids so as to prevent light scattering from the functioning LCD (compare FIGS. 1 and 2). Moreover, it was discovered that the adhesive material 34 provides the unexpected benefit of further protecting the ITO coating layer 32 bonding the deck plate 12 to the signal plate 18.

Figure 5:
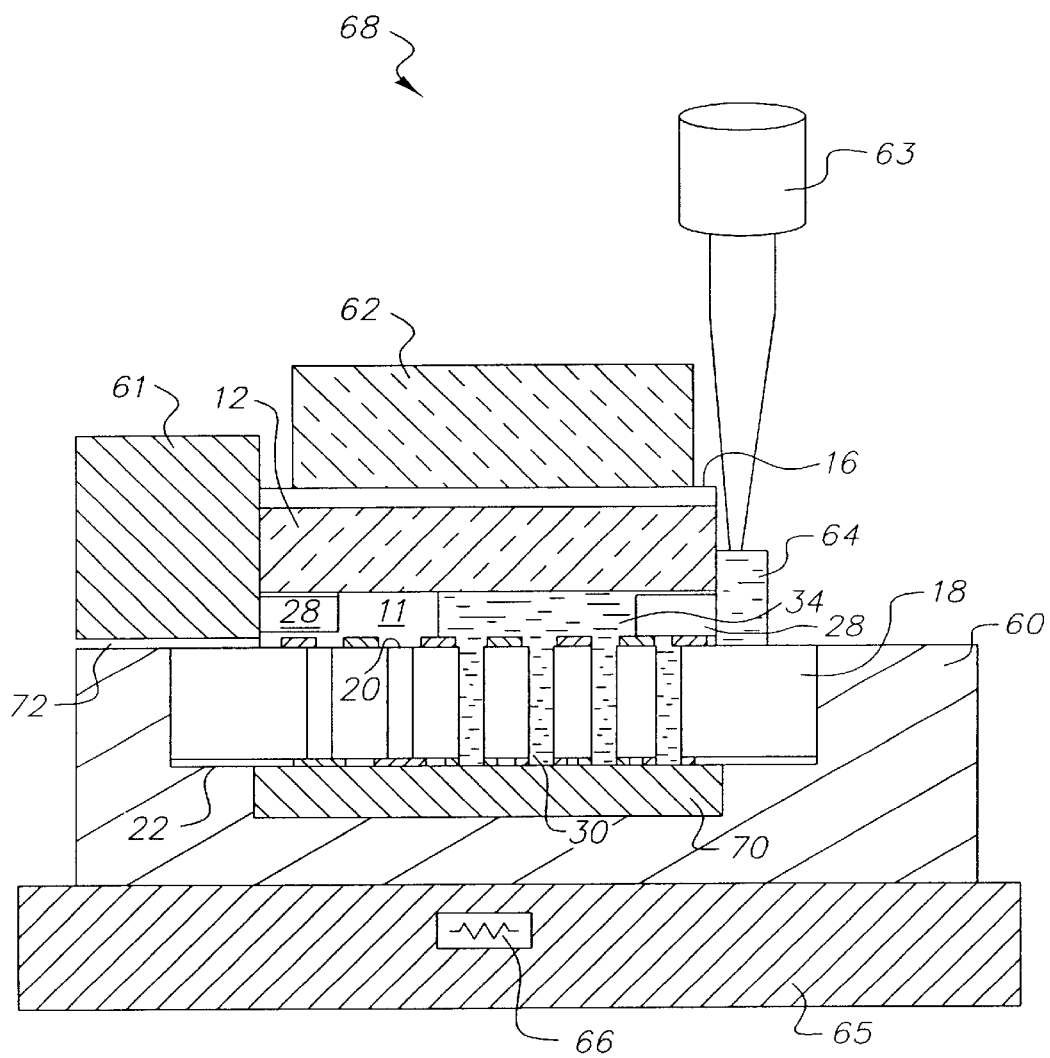

Referring to FIGS. 2 and 3, by carefully controlling gap 11 separating the deck plate 12 and active surface 20 of signal plate 18, we were able to facilitate capillary action that efficiently wicked the optical grade adhesive material 34 into the vias 30 formed in signal plate 18. Spacers 28, such as standoffs or shims, affixed to deck plate 12 is preferably used to control the spacing between deck plate 12 and signal plate 18. As shown in FIG. 5, surface tension and the presence of a cavity 70 in the assembly fixture 60 prohibit the optical grade adhesive material 34 from wicking out onto second active surface (alternatively referred to as the pixel side of the LCD element) 22 of signal plate 18. Second active surface 22 of signal plate 18 is then coated with a first polyimide alignment layer 38 which aligns the LCD medium 42 (typically a liquid crystal material formulation) with a second polyimide alignment layer 39 applied over a third transparent substrate (typically an electrode panel) 46. LCD medium 42 contains spacers, such as a plurality of glass spheres, 40 that separate first polyimide alignment layer 38 from second polyimide layer 39 on electrode panel 46 thereby forming the active region 43 of LCD. An epoxy seal 44 is applied to the perimeter of the electrode panel 46 before it is bonded to the second active surface 22 of signal plate 18. As shown in FIG. 2, electrode panel 46 comprises an active electrode surface 48 containing an ITO coating layer 52 and an outer passive electrode surface 50 opposite active electrode surface 48. Active electrode surface 48 generally faces LCD medium 42.

Referring to FIGS. 2, 3, 4 and 5, in constructing LCD element 10 of the invention, deck plate or first transparent substrate 12 is provided with a first surface 14 and an opposed second surface 16. Spacers 28 are bonded along peripheral edges 29, 31 of first surface 14 of deck plate 12 with a suitable adhesive, such as an epoxy. We prefer using an optical grade adhesive material 34 such as the same epoxy used to bond deck plate 12 and signal plate 18. Alternatively, the spacers 28 could be integrally formed into the deck plate 12 by etching and machining the deck plate 12. As can be appreciated in FIG. 2, signal plate 18 containing vias 30 filled with an optical grade adhesive material 34 provides a boundary wall for the liquid crystal when it is injected into the active region 43 of the LCD element 10. Moreover, second surface 16 of deck plate 12 is coated with a protective ultra-violet transparent protective layer 24 of a predetermined thickness to prevent light penetration through deck plate 12 and into gap 11. Those skilled in the art will appreciate that deck plate 12, of the present invention, is not contemplated in existing LCD elements.

With reference to FIG. 3, we have experimentally determined that the preferred thickness of spacers 28 structurally associated with deck plate 12 is about 0.150 mm. This preferred thickness of spacers 28 corresponds to deck plate 12 having a thickness of about 0.500-mm and a signal plate 18 having vias 30 with an average diameter of about 0.300-mm. Therefore, our experience indicates that the spacer thickness is modified based on the average diameter of the vias 30. The thickness of spacer 28 must be controlled to allow the adhesive material to flow into the vias 30.

Referring again to FIG. 3, formation of undesirable voids in adhesive material 34 filling vias 30 as well as insufficient filling of the vias 30 with optical grade adhesive material 34, preferably EpoTek 310™, are strongly influenced by the diameter of the vias 30 and dimensions of spacers 28. As examples, vias 30 having an average diameter of about 0.300 mm and the absence of spacers 28 affixed to deck plate 12 have both shown to produce voids in vias 30 and filling problems. The same result was observed if the spacers 28 had a thickness of less than about 0.075 mm. Referring to FIG. 2, gap 11 defined by the height of spacers 28 enables the vias in the signal plate 18 to be filled efficiently without introducing voids or air bubbles into the vias 30. As indicated previously, experience indicates that the presence of air bubbles in the vias 30 causes the light to scatter in the operating LCD.

According to FIG. 4, signal plate 18, in greater details, has opposed first and second active surfaces 20, 22. In stark contrast, prior art signal plates only have one active surface. In constructing the LCD element 10, first active surface 20 of signal plate 18 is bonded with a suitable optical grade adhesive material 34, such as an epoxy, acrylic or ester, to second surface 16 of deck plate 12. It is important to the invention that signal plate 18 has formed therein a plurality of vias 30. Vias 30 pass between the first active surface 20 and the second active surface 22 to facilitate electrical continuity between the first active surface 20 and the second active surface 22. Also, vias 30 in the signal plate 18 allow a higher patterning density for the LCD, thereby decreasing the LCD size. Vias 30 are filled with the optical grade adhesive material 34, as described more fully below, that prevents the formation of voids or air bubbles in the optical grade adhesive material 34. As indicated above in the prior art, voids or air bubbles in the adhesive filling become a source of undesirable light scatter (see for instance prior art FIG. 1).

Referring to FIGS. 2 and 4, skilled artisans will appreciate that vias 30 in signal plate or second substrate 18 may be formed in one of several ways. We prefer vias that have been drilled in the signal plate or second substrate 18 because the drill process is easier to use and results in smoother wall surfaces within the vias hole.

Referring to FIGS. 2 and 5, vias 30 in signal plate 18 are filled when the LCD element 10 of the invention is assembled. As indicated above, deck plate 12 is assembled with spacers 28 that spatially separate the deck plate 12 from the signal plate 18. The optical grade adhesive material 34 is dispensed along the perimeter of the deck plate 12 in an optimized pattern to minimize voiding between the two substrates (first transparent substrate or deck plate 12 and second transparent substrate or signal plate 18). Moreover, spacers 28 allow the optical grade adhesive material 34 to fill the vias 30 without voids. The process disclosed herein allows the manufactured LCD panels to meet the specification of a void free epoxy plug in the vias 30 and a void free deck plate 12 attachment to the signal plate 18. Voids in the adhesive either between the signal plate 18 and deck plate 12 or in the vias 30 of the signal plate 18 cause light to scatter in the LCD application.

Referring again to FIGS. 2 and 5, wicking of the optical grade adhesive material 34 beyond vias 30 and onto ITO pattern features is controllable by, among other ways, a novel and unobvious dispensing process. Also, predetermining surface tension effects of optical grade adhesive material 34, selectively designing cavity 70 in assembly fixture 60, and predetermining the height of spacers 28 also play important roles in preventing the optical grade adhesive materials 34 from wicking beyond vias 30 and onto the ITO coating layer 32. By using the dispensing process of the invention, vias 30 are filled to a plug height (h) that ranges from no more than about 5 microns above active surface 22 of signal plate 18 to not less than 40 microns below active surface 22 of signal plate 18.

Figure 6:
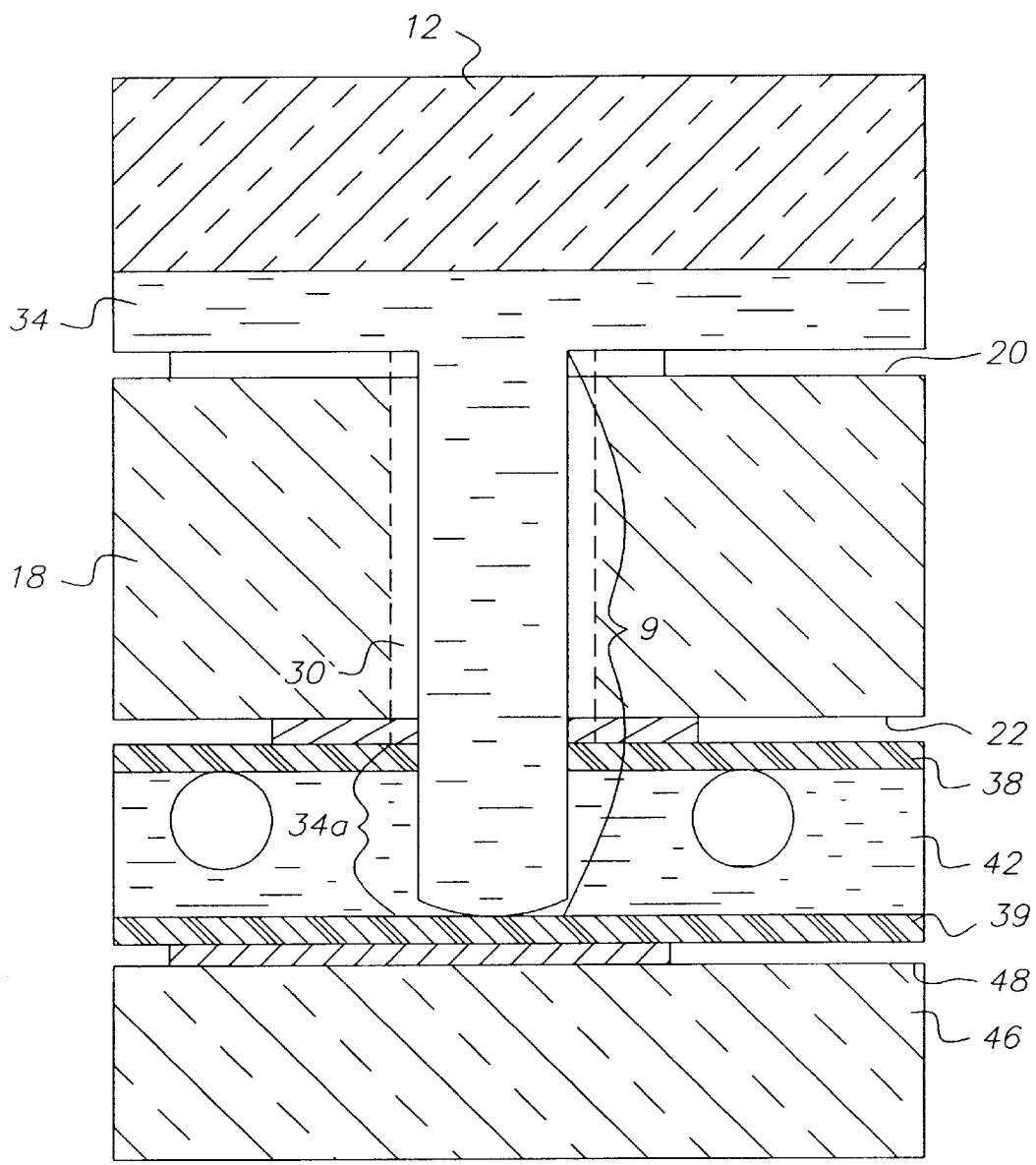
FIG. 6 is a partial cross sectional view of the signal plate having vias with excessive optical grade epoxy material therein; and, FIG. 7 is a partial cross sectional view of the signal plate having vias deficient in optical grade material therein.

Referring to FIG. 6, if optical grade material in vias 30 exceed a plug height (h) greater than about 5 microns beyond second active surface 22, the excess material level 34a which extends into the polyimide layer 38 and into the liquid crystal medium 42 will interfere with the application, preferably coating, of polyimide alignment layer 38 onto the second surface 22 of signal plate 18. Moreover, the excess material level 34a may interfere with the formation of patterns (not shown) on polyimide layer 38. Furthermore, excess material level 34a may cause an increased separation between second active surface 22 and an active surface 48 of electrode panel 46. Therefore, the result of excessive material level 34a in vias 30 would be improper alignment of the liquid crystal medium 42.

Figure 7:
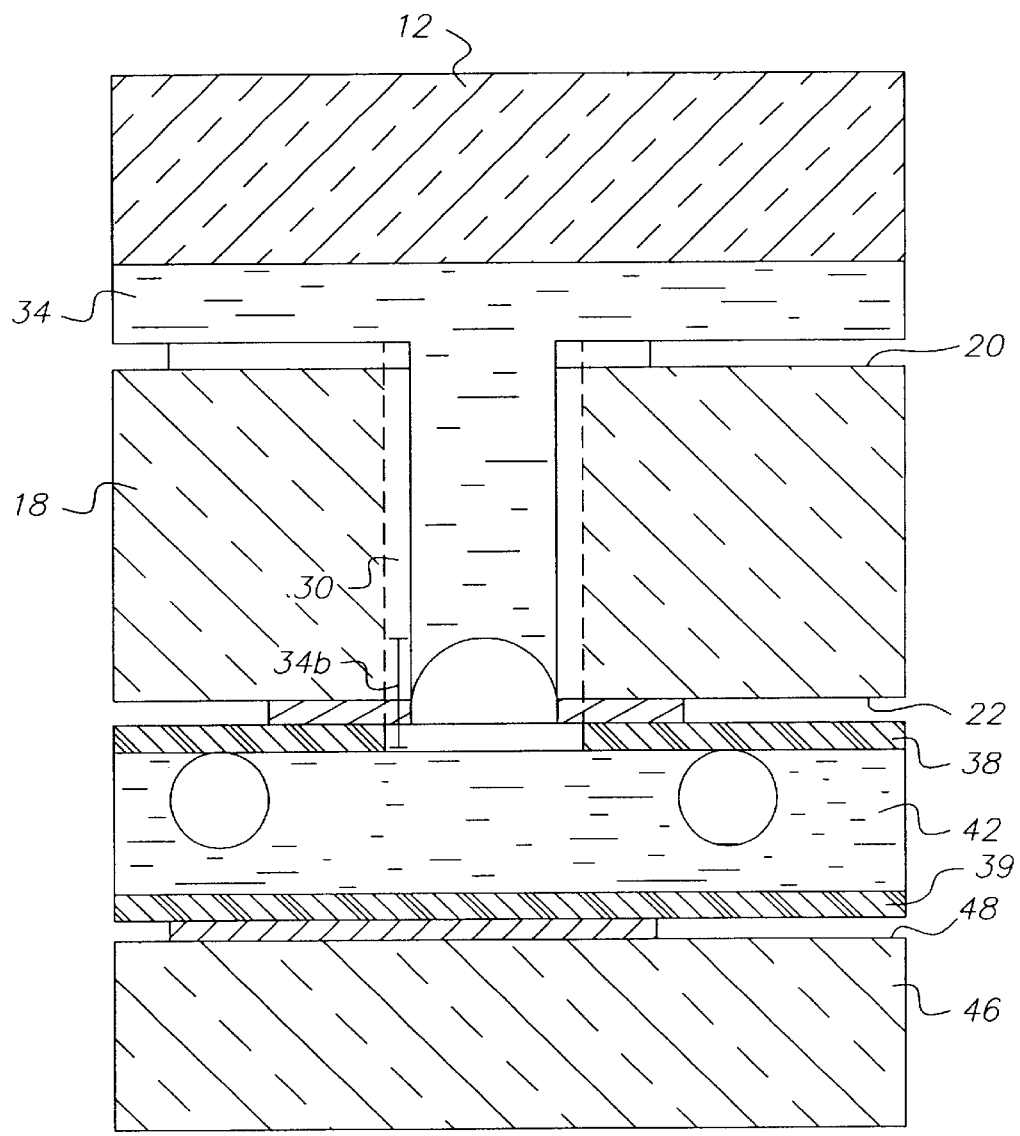

Referring now to FIG. 7, if optical grade material in vias 30 exceed a plug height (h) less than about 40 microns below the second active surface 22, the deficient material level 34b which falls below the polyimide layer 38 in vias 30 will also interfere with the application, preferably coating, of polyimide alignment layer 38 onto the second surface 22 of signal plate 18. Therefore, the result of deficient material level 34b in vias 30 would also be improper alignment of the liquid crystal medium 42.

Those skilled in the art will appreciate that several known processes exist for filling vias 30 in a workpiece, for instance, an LCD element. Among the method currently used include screen printing and pressure rolling. However, these alternative methods are known to exert a force on the LCD element 10 forcing the optical grade adhesive material 34 through vias 30 and thereby contaminating second active surface 22 of signal plate 18. Of course, an additional process step would then be required which would include an adhesive removal and cleaning process. Experience has taught that optical grade adhesive material 34 removal affects the optical quality of the optical grade adhesive material 34 as well as the adherence of the remaining optical grade adhesive material 34 to interior walls 33 of vias 30. Moreover, dispense processes, like screen-printing, introduce air into the vias 30 as the optical grade adhesive material 34 is dispensed into the vias 30.

Referring again to FIG. 5, an important novel and unobvious process for filling vias 30 free of air pockets or voids is now described. Our preferred adhesive material dispense process requires several important steps in order to construct the LCD element 10 of the invention. Assemblage for adhesive material dispense process 68 containing assembly fixture 60 is used. Assembly fixture 60 has a cavity 70 alignable under the vias 30 drilled in the signal plate 18. Cavity 70 keeps the dispensed optical grade adhesive material 34, such as epoxy, from exiting the vias 30 after the optical grade adhesive material 34 has flowed into the vias 30. If the cavity 70 was not present in the assembly fixture 60, then capillary action would continue to pull the epoxy out of the vias 30 and contaminate the second active surface 22 of signal plate 18 with epoxy and create voids in the vias 30.

According to FIG. 5, at the outset, signal plate 18 is placed in the assembly fixture 60 and a positioning bracket 61 is slid into place. The positioning bracket 61 was designed to hold the deck plate 12 in place during the epoxy dispensing process. The positioning bracket 61 allows the deck plate 12 to be aligned properly prior to adhesive dispense. Moreover, the positioning bracket 61 was designed with a gap 72 so it would not slide on top of first active surface 20 of signal plate 18. Furthermore, it is important that the design of positioning bracket 61 not interfere with the optical grade adhesive material 34 as it flows between the deck plate 12 and signal plate 18.

Referring again to FIG. 5, after the deck plate 12 is positioned on top of the signal plate 18, a stabilizing member, preferably a glass block 62, is placed on top of the deck plate 12. The weight of glass block 62 keeps the deck plate 12 from moving either rotationally or translationally, during adhesive dispensing. A quartz block is preferably used, however the glass block 62 could also be fabricated from other materials such as aluminum. Since the deck plate 12 is mounted to signal plate 18 at the same time the optical grade adhesive material 34 in the vias 30 is cured, some sort of supporting weight on the deck plate 12 is required. Without the glass block 62, there would be thickness variations in LCD elements produced in this process. If the deck plate 12 is allowed to float, i.e., is not supported by glass block 62 or its equivalent, the deck plate 12 would displace the excess optical grade adhesive material 34 from the vias 30 to the second active surface 22 of the signal plate 18. The same would result if deck plate 12 is allowed to stabilize to the plug height (h) of spacers 28 during adhesive material curing. Displacement of the optical grade adhesive material 34 invariably contaminates the patterned ITO and causes defective pixels in the LCD.

Again referring to FIG. 5, once the signal plate 18 and deck plate 12 are arranged in the assembly fixture 60, the optical grade adhesive material 34 is dispensed with an automated dispensing unit 63. The dispensing unit 63 contains a base plate 65 with a heating element 66, preferably a hot plate, that preheats the assembly fixture 60, the signal plate 18, and the deck plate 12. Preheating assists the flow of the optical grade adhesive material 34. The optical grade adhesive material 34 is dispensed in a predetermined pattern, preferably a substantially "L" shaped pattern along two perimeter edges of deck plate 12. This technique prevents the occurrence of voids or air bubbles in the adhesive layer 34 between the signal plate 18 and deck plate 12, as previously described. A void in adhesive material 34 causes incoming light to scatter during the LCD application. More particularly, adhesive material 34 is dispensed along perimeter 64 of the deck plate 12. Capillary action allows the adhesive material 34 to flow between the deck plate 12 and the signal plate 18. By dispensing adhesive material 34 along the perimeter 64 of the deck plate 12, capillary action fills the gap 11 between the deck plate 12 and signal plate 18. The 0.15-mm spacer 28 between the deck plate 12 and the signal plate 18 enables the adhesive material 34 to flow into the vias 30 without trapping air in the vias 30 and creating voids. Since surface tension controls the flow depth of the adhesive material 34 in vias 30, when the adhesive material exits the vias 30, surface tension keeps it from flowing out of the vias 30 onto the patterned ITO.

The invention has been described with reference to a preferred embodiment. However, it will be appreciated that variations and modifications can be effected by a person of ordinary skill in the art without departing from the scope of the invention.

Parts List:

1 liquid crystal display element of prior art
2 vias in prior art LCD display element
3 prior art transparent substrate
4 prior art active surface second side signal plate
5 prior art active surface first side signal plate
6 indium tin oxide (ITO) layer
7 prior art deck plate
8 void in adhesive material
9 adhesive material layer
10 liquid crystal display element of the invention
11 gap
12 first transparent substrate or deck plate
14 first surface of deck plate 12
16 second surface of deck plate
18 second transparent substrate or signal plate
20 first active surface of signal plate 18
22 second active surface of signal plate 18
24 UV transparent protective layer
28 spacers
29 peripheral edge
30 vias
31 peripheral edge
32 ITO coating layer
33 interior wall of vias
34 optical grade adhesive material
34a excessive material level
34b deficient material level
36 signal plate
38 polyimide alignment layer
39 second polyimide layer
40 spacer beads
42 Liquid crystal medium
43 active region of LCD element 10
44 epoxy seal
46 third transparent substrate or electrode panel
48 active electrode surface of electrode panel 46
50 passive electrode surface of electrode panel 46
52 ITO coating layer on electrode panel 46
60 assembly fixture
61 positioning bracket
62 glass block
63 Automated dispensing unit
64 Adhesive dispensed along perimeter of deck plate 12
65 base plate
66 heating element
68 assemblage for adhesive material dispense process
70 cavity under signal plate
72 gap between positioning bracket and signal plate

What is claimed is:

1. An apparatus for introducing a fluid into vias formed in a liquid crystal display element, said fluid being introduced into said vias substantially free of voids therein, comprises:

(a) a support base for securing said LCD element;

(b) a fluid dispenser having a fluid outlet orifice and a reservoir in fluid communication with said fluid outlet orifice, said fluid dispenser being arranged relative to said support base for controllably facilitating fluid flow between said fluid outlet orifice and said vias in said LCD element; and, (c) means for facilitating flow of fluid between said LCD element and said fluid dispenser.

2. The apparatus recited in claim 1 further comprising means for alignably positioning said LCD element relative to said fluid dispenser.

3. The apparatus recited in claim 1 further comprising means for supporting said LCD element against translational and rotational movements.

4. The apparatus recited in claim 3 wherein said means for supporting comprises a load resting uniformly on an exposed substantially flat surface abutting said LCD element.

5. The apparatus recited in claim 4 wherein said load is a quartz block.

6. The apparatus recited in claim 1 wherein a recess portion is formed in said support base, said recess portion being configured to openly support a portion of said LCD element and expose vias therein.

7. The apparatus recited in claim 1 wherein said means for facilitating flow of fluid comprises a heating element arranged thermally in contact with said support base.

8. The apparatus recited in claim 1 wherein said means for facilitating flow of fluid is a hot plate.

* * * * *